US012776816B2

(12) United States Patent
Nagalapur et al.

(10) Patent No.: US 12,776,816 B2
(45) Date of Patent: Oct. 27, 2026

(54) CSI REPORTING FOR TYPE II PRECODER

(71) Applicant: TELEFONAKTIEBOLAGET LM ERICSSON (PUBL), Stockholm (SE)

(72) Inventors: Keerthi Kumar Nagalapur, Gothenburg (SE); Fredrik Athley, Gothenburg (SE); Johan Winges, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 50 days.

(21) Appl. No.: 18/861,379

(22) PCT Filed: Apr. 29, 2023

(86) PCT No.: PCT/IB2023/054481
§ 371 (c)(1),
(2) Date: Oct. 29, 2024

(87) PCT Pub. No.: WO2023/209685
PCT Pub. Date: Nov. 2, 2023

(65) Prior Publication Data

US 2025/0293742 A1 Sep. 18, 2025

Related U.S. Application Data

(60) Provisional application No. 63/336,869, filed on Apr. 29, 2022.

(51) Int. Cl.
*H04B 7/06* (2006.01)
*H04B 7/0456* (2017.01)

(52) U.S. Cl.
CPC ......... *H04B 7/0626* (2013.01); *H04B 7/0481* (2023.05)

(58) Field of Classification Search
CPC ...... H04B 7/06; H04B 7/0417; H04B 7/0452; H04B 7/0456; H04B 7/0481;
(Continued)

(56) References Cited

U.S. PATENT DOCUMENTS

| | | | | |
|---|---|---|---|---|
| 2022/0094412 A1* | 3/2022 | Ren | ........................ | H04L 5/0057 |
| 2022/0329303 A1* | 10/2022 | Rahman | ............... | H04B 7/0626 |
| 2025/0080175 A1* | 3/2025 | Park | ..................... | H04B 7/0634 |

FOREIGN PATENT DOCUMENTS

WO 2023010245 A1 2/2023

OTHER PUBLICATIONS

Ramireddy et al., "Enhancements on Type-II 5G New Radio Codebooks for UE Mobility Scenarios", Evalution of 5G NR MIMO Standards, IEEE Communications Standards Magazine, Mar. 2022, pp. 35-40.
(Continued)

*Primary Examiner* — Shawkat M Ali

(57) ABSTRACT

According to some embodiments, a method is performed by a wireless device for channel state information (CSI) reporting. The method comprises: measuring multiple instances of a CSI reference signal (CSI-RS) over a span of time instances; estimating linear combination coefficients to combine a spatial domain (SD) basis, a frequency domain (FD) basis, and a Doppler domain (DD) basis from the measurements of the multiple CSI-RS instances: and predicting a precoder using the linear combination coefficients, the SD basis, the FD basis, and the DD basis.

20 Claims, 14 Drawing Sheets

(58) Field of Classification Search
CPC ....... H04B 7/0626; H04B 7/0634; H04L 1/00; H04L 5/00; H04L 27/26; H04W 4/00; H04W 16/28; H04W 24/08; H04W 24/10; H04W 72/04
USPC ......................... 375/219, 260, 267, 295, 316
See application file for complete search history.

(56) References Cited

OTHER PUBLICATIONS

Samsung (Moderator), "New WID: MIMO Evolution for Downlink and Uplink", 3GPP TSG RAN Meeting #94e, RP-213598, Electronic Meeting, Dec. 6-17, 2021.

* cited by examiner

1400

CSI REPORTING FOR TYPE II PRECODER

PRIORITY APPLICATIONS

This application is a national phase application of International Patent Application No. PCT/IB2023/054481, filed Apr. 29, 2023, which claims the benefit of U.S. Provisional Patent Application No. 63/336,869, filed Apr. 29, 2022, the disclosures of which are hereby incorporated herein by reference in their entirety.

TECHNICAL FIELD

Embodiments of the present disclosure are directed to wireless communications and, more particularly, to channel state information (CSI) reporting for a type II precoder.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, operation, etc. are to be interpreted openly as referring to at least one instance of the element, apparatus, component, means, operation, etc., unless explicitly stated otherwise. The operations of any methods disclosed herein do not have to be performed in the exact order disclosed, unless an operation is explicitly described as following or preceding another operation and/or where it is implicit that an operation must follow or precede another operation. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Third Generation Partnership Project (3GPP) new radio (NR) standard is currently evolving with enhanced MIMO support. A core component in NR is the support of MIMO antenna deployments and MIMO related techniques like, for example, spatial multiplexing. The spatial multiplexing mode is aimed for high data rates in favorable channel conditions. An example of spatial multiplexing operation is illustrated in FIG. 1.

FIG. 1 is a block diagram illustrating a transmission structure of precoded spatial multiplexing mode in New Radio (NR). As illustrated, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved because multiple symbols can be transmitted simultaneously over the same time/frequency resource element (TFRE). The number of symbols r is typically adapted to suit the current channel properties.

NR uses orthogonal frequency division multiplexing (OFDM) in the downlink (and discrete Fourier transform (DFT) precoded OFDM in the uplink for rank-1 transmission) and thus the received $N_R \times 1$ vector $y_n$ for a certain TFRE on subcarrier n (or alternatively data TFRE number n) is modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in channel dependent precoding. This is also commonly referred to as closed-loop precoding and essentially focuses the transmit energy into a subspace which is strong in the sense of conveying much of the transmitted energy to the user equipment (UE).

In closed-loop precoding for the NR downlink, the UE transmits, based on channel measurements in the downlink, recommendations to the gNB of a suitable precoder to use. The gNB configures the UE to provide feedback according to CSI-ReportConfig and may transmit channel state information reference signal (CSI-RS) and configure the UE to use measurements of CSI-RS to feedback recommended precoding matrices that the UE selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per subband.

This is an example of the more general case of channel state information (CSI) feedback, which also encompasses feeding back other information than recommended precoders to assist the gNodeB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 physical resource blocks (PRBs) depending on the band width part (BWP) size.

Given the CSI feedback from the UE, the gNB determines the transmission parameters it wishes to use to transmit to the UE, including the precoding matrix, transmission rank, and modulation and coding scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

With multi-user MIMO (MU-MIMO), two or more users in the same cell are co-scheduled on the same time-frequency resource(s). That is, two or more independent data streams are transmitted to different UEs at the same time, and the spatial domain can typically be used to separate the respective streams. By transmitting several streams simultaneously, the capacity of the system can be increased. This, however, comes at the cost of reducing the signal to interference and noise ratio (SINR) per stream, as the power must be shared between streams and the streams will cause interference to each-other.

For CSI measurement and feedback, CSI-RS are defined. A CSI-RS is transmitted on each antenna port and is used by a UE to measure downlink channel between each of the transmit antenna ports and each of its receive antenna ports. The transmit antenna ports are also referred to as CSI-RS ports.

The supported number of antenna ports in NR are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. An example is illustrated in FIG. 2.

FIG. 2 is a time-frequency diagram illustrating an example of CSI-RS resource element (RE) allocation for a 12-port CSI-RS in NR. The illustrated example includes Res for 12 antenna ports, where 1 RE per RB per port is shown.

In addition, interference measurement resource (IMR) is also defined in NR for a UE to measure interference. An IMR resource contains 4 REs, either 4 adjacent REs in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI, i.e., rank, precoding matrix, and the channel quality.

Furthermore, a UE in NR may be configured to measure interference based on one or multiple NZP CSI-RS resource.

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report.

Each CSI reporting setting contains at least the following information: (a) A CSI-RS resource set for channel measurement; (b) an IMR resource set for interference measurement; (c) optionally, a CSI-RS resource set for interference measurement; (d) time-domain behavior, i.e. periodic, semi-persistent, or aperiodic reporting; (e) frequency granularity, i.e., wideband or subband; (f) CSI parameters to be reported such as RI, PMI, CQI, and CSI-RS resource indicator (CRI) in case of multiple CSI-RS resources in a resource set; (g) codebook types, i.e., type I or II, and codebook subset restriction; (h) measurement restriction; and (i) subband size. One out of two possible subband sizes is indicated. The value range depends on the bandwidth of the BWP. One channel quality indicator (CQI)/precoding matrix indicator (PMI) (if configured for subband reporting) is fed back per subband.

When the CSI-RS resource set in a CSI reporting setting contains multiple CSI-RS resources, one of the CSI-RS resources is selected by a UE and a CSI-RS resource indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting setting, each with a different CSI-RS resource set for channel measurement and/or resource set for interference measurement can be configured and triggered at the same time. In this case, multiple CSI reports are aggregated and sent from the UE to the gNB in a single physical uplink shared channel (PUSCH).

Type I codebook (CB) is typically used by a UE to report CSI for single user MIMO (SU-MIMO) scheduling in N, while Type II CB is typically for more accurate CSI feedback for multi-user MIMO (MU-MIMO) scheduling.

For both Type I and Type II CBs, for each rank, a precoding matrix W is defined in the form of $W=W_1W_2$ where $$W_1 = \begin{bmatrix} d_1 & d_2 & \dots & d_L & 0 & 0 & \dots & 0 \\ 0 & 0 & \dots & 0 & d_1 & d_2 & \dots & d_L \end{bmatrix}$$

is a 2N×2L matrix and contains information of L selected DFT beams $\{d_i, i=1, \dots, L\}$, where $d_i$ is a N×1 DFT vector and N is the number of CSI-RS ports per polarization; while $W_2$ is a 2L×v matrix and contains the co-phasing coefficients between the selected beams and also between antenna ports with two different polarizations, where v is the number of layers or rank. $W_1$ is the same for the whole CSI bandwidth while $W_2$ can be for the entire bandwidth or per subband.

For Type I CB, the precoding vector for each MIMO layer is associated with a single DFT beam. While for Type II CB, the precoding vector for each layer is a linear combination of multiple DFT beams.

In NR Rel-16, Type II CB is enhanced by applying frequency domain (FD) DFT basis across all subbands to reduce CSI feedback overhead and/or improve CSI accuracy. Instead of reporting $W_2$ for each subband, linear combinations of DFT basis vectors are used to jointly represent $W_2$ across the entire CSI bandwidth. For each layer, a precoding matrix W across all subbands is in the form of $$W = W_1 \tilde{W}_2 W_f^H$$

where $W_f$ =[$f_1, \dots, f_M$] is a matrix containing M selected DFT basis vectors $\{f_1, \dots, f_M\}$, $\tilde{W}_2$ is 2L×M matrix containing the coefficients for each selected DFT beam and each selected FD basis vector.

The relative motion between a transmitter and a receiver result in Doppler spread. Under the assumption that the bandwidth of the transmitted signal is very small compared to the carrier frequency $f_c$, a signal component making an angle of θ with the direction of motion of the receiver results in a Doppler shift of $$f_D = f_c \cdot \left(\frac{v}{c}\right) \cdot \cos\theta,$$

where v is the relative speed of the receiver, and c is the speed of light in free space. The maximum possible Doppler shift, $f_{D,max}$ is obtained when θ=0 and π. For multipath propagation, signal components arriving at the receiver from different directions experience different Doppler shifts and the total received signal exhibits a frequency spread around the carrier frequency. The width of the spread around the carrier frequency is referred to as Doppler spread. The precise definition of Doppler spread varies across literature and $f_{D,max}$ is often used as an approximation for Doppler spread. The Doppler characteristics of the received signal are typically captured using the Doppler power spectrum, which is related to the autocorrelation function in time of the time-varying channel through a Fourier transform. Therefore, availability of Doppler power spectrum or its properties allows modeling the time-variations of a channel.

There currently exist certain challenges. For example, downlink MU-MIMO precoding performance degrades when one or more of the co-scheduled UEs start to move faster than a few km/h relative to the base station. One of the main reasons is that the information of the channels, used to compute the MIMO precoding at the base station, becomes outdated relatively soon when this occurs. Thereby, the precoder loses its effectiveness to protect co-scheduled users from interference when transmitting to an intended user. Thus, downlink MU-MIMO precoding needs to be more robust for higher UE speeds.

One solution to mitigate this problem and to cope with such rapid channel variations is to configure faster CSI reporting (i.e., more frequent CSI reporting and measurement). A problem with this approach is large signaling and reporting overhead. Thus, with the current CSI framework in NR it is difficult to obtain accurate CSI for medium-to-high-speed UEs with a reasonable amount of overhead.

An objective with the 3GPP Rel-18 work item on MIMO Evolution for Downlink and Uplink (3GPP RP-213598) is to study, and if justified, specify CSI reporting enhancement for high/medium UE velocities by using time-domain correlation/Doppler-domain information to assist downlink precoding.

SUMMARY

As described above, certain challenges currently exist with channel state information (CSI) reporting for a type II precoder for user equipment (UE) travelling at high velocity. Certain aspects of the present disclosure and their embodiments may provide solutions to these or other challenges.

For example, particular embodiments include refinement of the Third Generation Partnership Project (3GPP) Type II codebooks that use Doppler domain information to make the channel state information (CSI) more useful for moving UEs. Particular embodiments are based on augmenting the Type II codebook structure by a Doppler domain (DD) compression matrix to capture the time variations of the channel. This also implies that the linear combination coefficient matrix becomes a three-dimensional matrix that combines the selected spatial domain (SD), frequency domain (FD), and DD basis vectors. Particular embodiments include methods to obtain the linear combination coefficient matrix and to predict a future precoder based on such a CSI report.

According to some embodiments, a method performed by UE for CSI reporting comprises the UE receiving configuration of NZP CSI-RS resource(s) span over multiple time instances for channel measurement and receiving configuration for CSI reporting associated with the configured NZP CSI-RS resource(s) wherein one of the following sets of contents is configured to be reported in the same report, which can be used by a gNB for predicting a Type II precoder.

The method further comprises estimating the linear combination coefficients to combine the SD basis, the FD basis and the DD basis from multiple CSI-RS instances. The linear combination coefficients may be represented by a three-dimensional matrix. The method includes constructing DD basis when the CSI-RS instances available for estimating the linear combination coefficients are uniformly spaced in time, or when the CSI-RS instances available for estimating the linear combination coefficients are non-uniformly spaced in time, where the DD basis are derived by re-sampling DFT vectors over the indices corresponding to the CSI-RS time instances.

The method further comprises selecting a subset of the SD basis, the FD basis and the DD basis based on a selection criterion and predicting a precoder where the prediction is performed using the linear combination coefficients, the SD basis, the FD basis, and the DD basis, and optionally predicting channel quality indicator using the predicted precoder.

The method further comprises reporting: the subset of SD, FD, and DD basis indices along with the corresponding linear combination coefficients; a predicted precoder where the prediction is performed using the linear combination coefficients, the SD basis, the FD basis, and the DD basis; and a predicted channel quality indicator using the predicted precoder.

According to some embodiments, a method performed by gNB for precoder prediction comprises the gNB configuring a UE with NZP CSI-RS resource(s) span over multiple time instances for channel measurement and configuring the UE with CSI reporting associated with the configured NZP CSI-RS resource(s), wherein one of the following sets of contents is configured to be reported in the same report: SD, FD, and DD basis indices along with the corresponding linear combination coefficients.

The above options indicate example contents to be reported in the CSI report, other contents, such as rank indicator (RI), channel quality indicator (CQI), may also be reported.

The method further comprises the gNB receiving the configured CSI report from the UE and predicting the precoder using the reported SD, FD, DD basis indices, and corresponding linear combination coefficients.

According to some embodiments, a method is performed by a wireless device for channel state information (CSI) reporting. The method comprises: measuring multiple instances of a CSI reference signal (CSI-RS) over a span of time instances; estimating linear combination coefficients to combine a spatial domain (SD) basis, a frequency domain (FD) basis, and a Doppler domain (DD) basis from the measurements of the multiple CSI-RS instances; and predicting a precoder using the linear combination coefficients, the SD basis, the FD basis, and the DD basis.

In particular embodiments, the method further comprises reporting to a network node the predicted precoder. The method may include reporting to a network node an indication of the SD basis, FD basis, DD basis and the corresponding linear combination coefficients.

In particular embodiments, the method further comprises predicting a channel quality indicator (CQI) using the predicted precoder and reporting to a network node the predicted CQI.

In particular embodiments, the method further comprises: selecting a subset of the SD basis, the FD basis, and the DD basis based on a selection criterion, wherein predicting the precoder is based on the selected subset; and reporting to a network node the selected subset of the SD basis, the FD basis, and the DD basis.

In particular embodiments, the linear combination coefficients are represented by a three-dimensional matrix where elements of the three-dimensional matrix denote weights to use to combine the SD basis, the FD basis, and the DD basis.

In particular embodiments, the multiple instances of the CSI-RS are uniformly spaced in time. In particular embodiments, the multiple instances of the CSI-RS are not uniformly spaced in time and Doppler basis vectors are modified to match the measurement instances.

In particular embodiments, the method further comprises receiving from a network node a measurement configuration for measuring the multiple instances of the CSI-RS over the span of time instances and/or a configuration for reporting CSI associated with the multiple instances of the CSI-RS over the span of time instances.

According to some embodiments, a wireless device comprises processing circuitry operable to perform any of the methods of the wireless device described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method is performed by a network node for configuring a wireless device for CSI reporting. The method comprises transmitting to a wireless device a measurement configuration for measuring multiple instances of a CSI-RS over a span of time instances and a configuration for reporting CSI associated with the multiple instances of the CSI-RS over the span of time instances and receiving from the wireless device a CSI report associated with the multiple instances of the CSI-RS over the span of time instances. The CSI report comprises an indication of an estimation of linear combination coefficients to combine a SD basis, a FD basis, and a DD basis from the measurements of the multiple CSI-RS instances performed by the wireless device. The method further comprises predicting a precoder using the linear combination coefficients, the SD basis, the FD basis, and the DD basis.

In particular embodiments, the method further comprises predicting a channel quality indicator (CQI) using the predicted precoder.

In particular embodiments, the linear combination coefficients are represented by a three-dimensional matrix where elements of the three-dimensional matrix denote weights to use to combine the SD basis, the FD basis, and the DD basis.

In particular embodiments, the multiple instances of the CSI-RS are uniformly spaced in time. In particular embodiments, the multiple instances of the CSI-RS are not uniformly spaced in time and Doppler basis vectors were modified to match the measurement instances.

Another computer program product comprises a non-transitory computer readable medium storing computer readable program code, the computer readable program code operable, when executed by processing circuitry to perform any of the methods performed by the network nodes described above.

Certain embodiments may provide one or more of the following technical advantages. For example, according to particular embodiments Type II CSI becomes more robust to channel variations caused by, e.g., moving UEs. The CSI report may be used to predict a future precoder to improve performance for moving UEs without incurring excessive reporting overhead.

BRIEF DESCRIPTION OF THE DRAWINGS

For a more complete understanding of the disclosed embodiments and their features and advantages, reference is now made to the following description, taken in conjunction with the accompanying drawings, in which.

Figure 5:
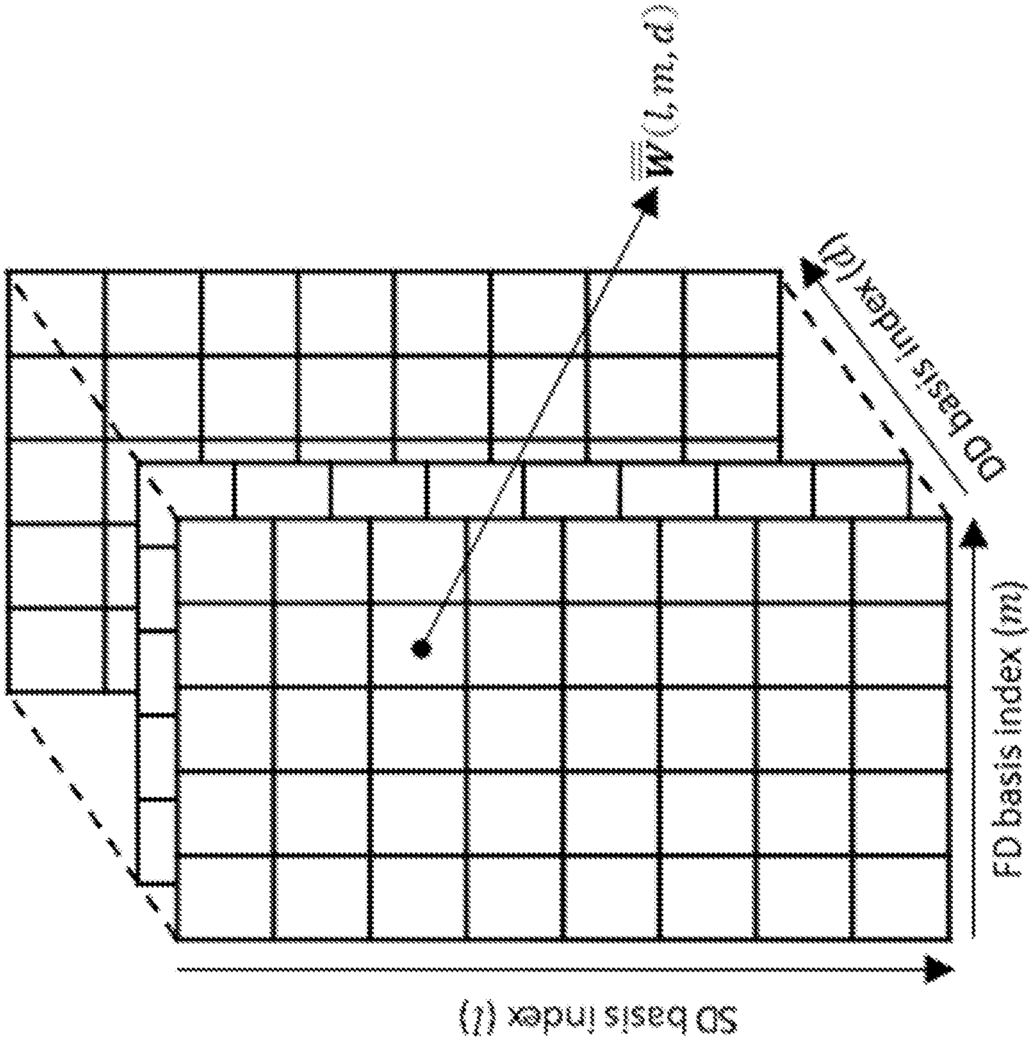
Figure 6:
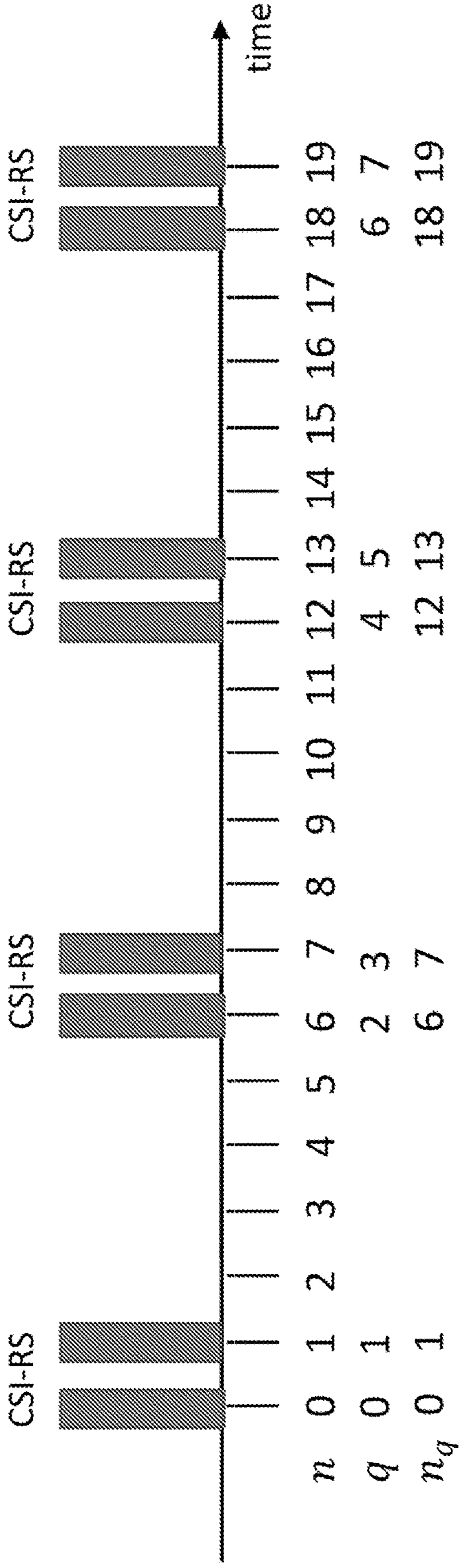

matrices, according to a particular embodiment;

FIG. 5 illustrates the three-dimensional coefficient matrix $\overline{W}$, according to particular embodiments;

FIG. 6 is a timing diagram illustrating uniformly spaced bursts of a pair of CSI-RS, according to some embodiments.

Figure 7:
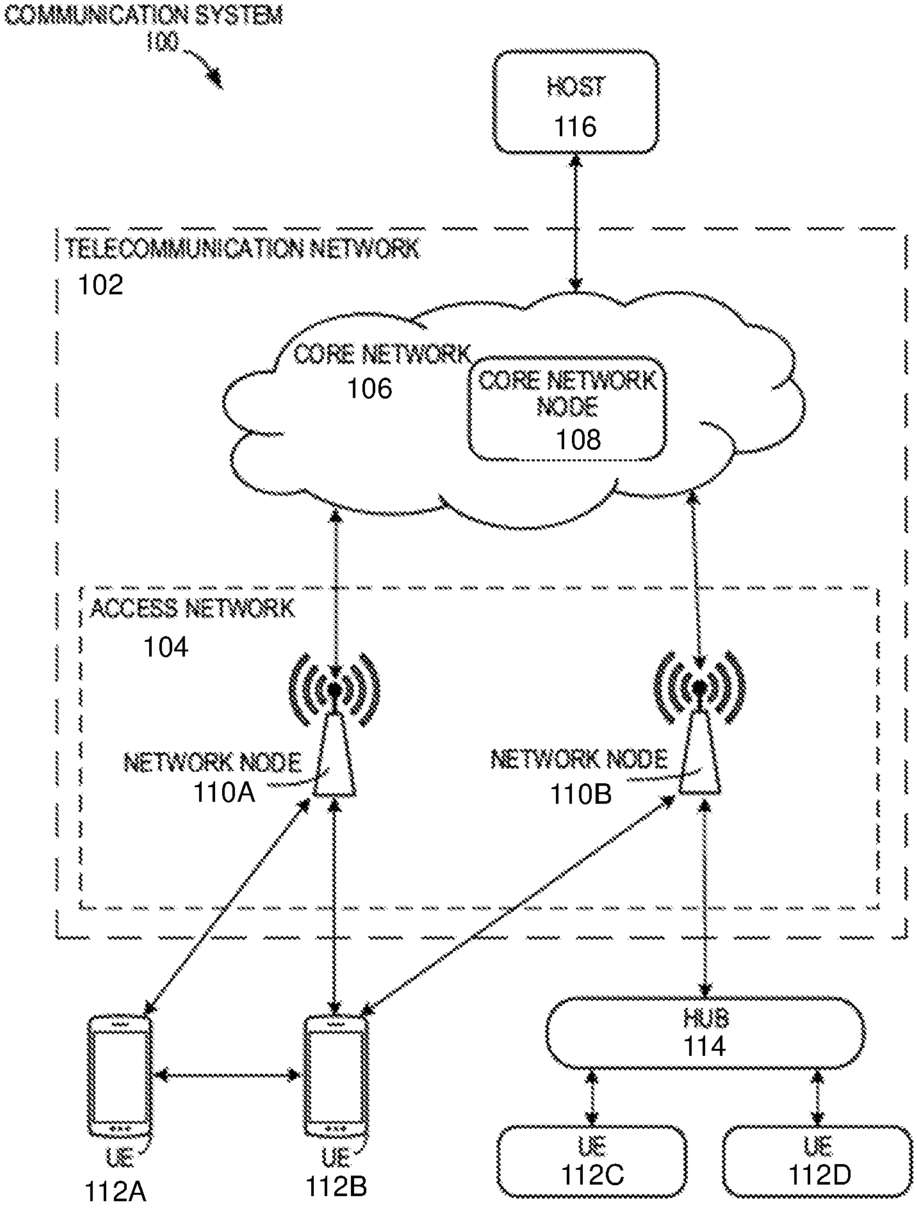
Figure 8:
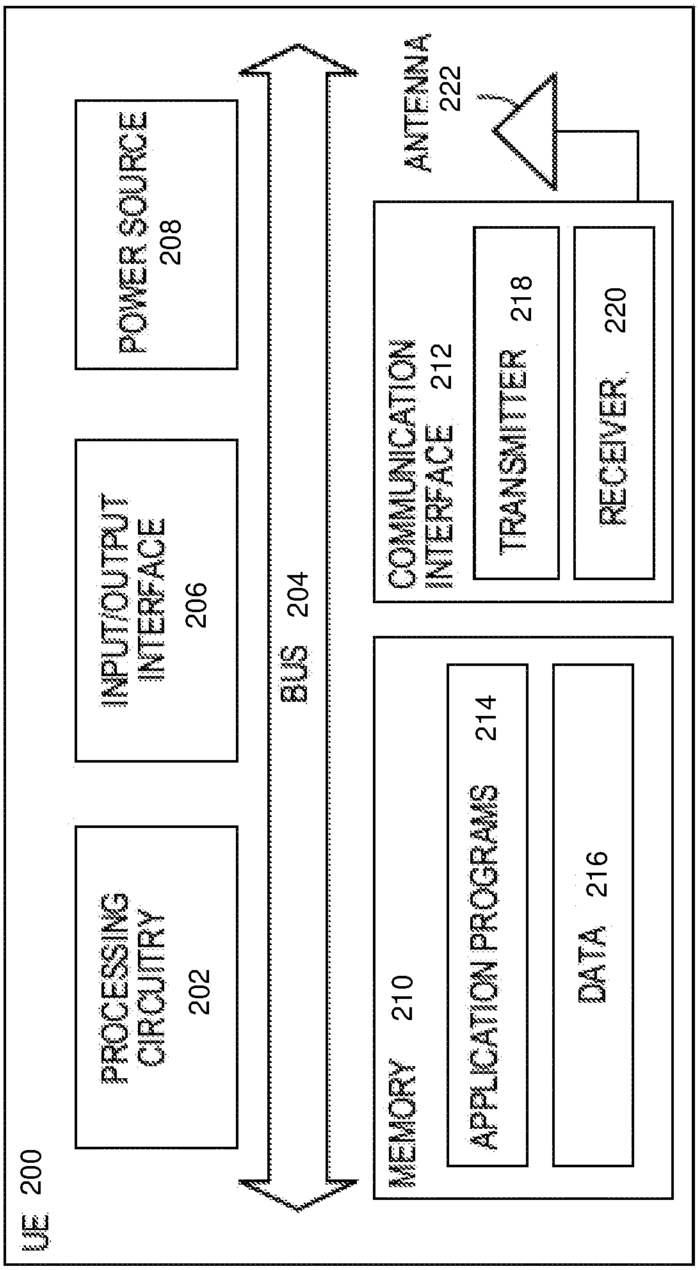
Figure 9:
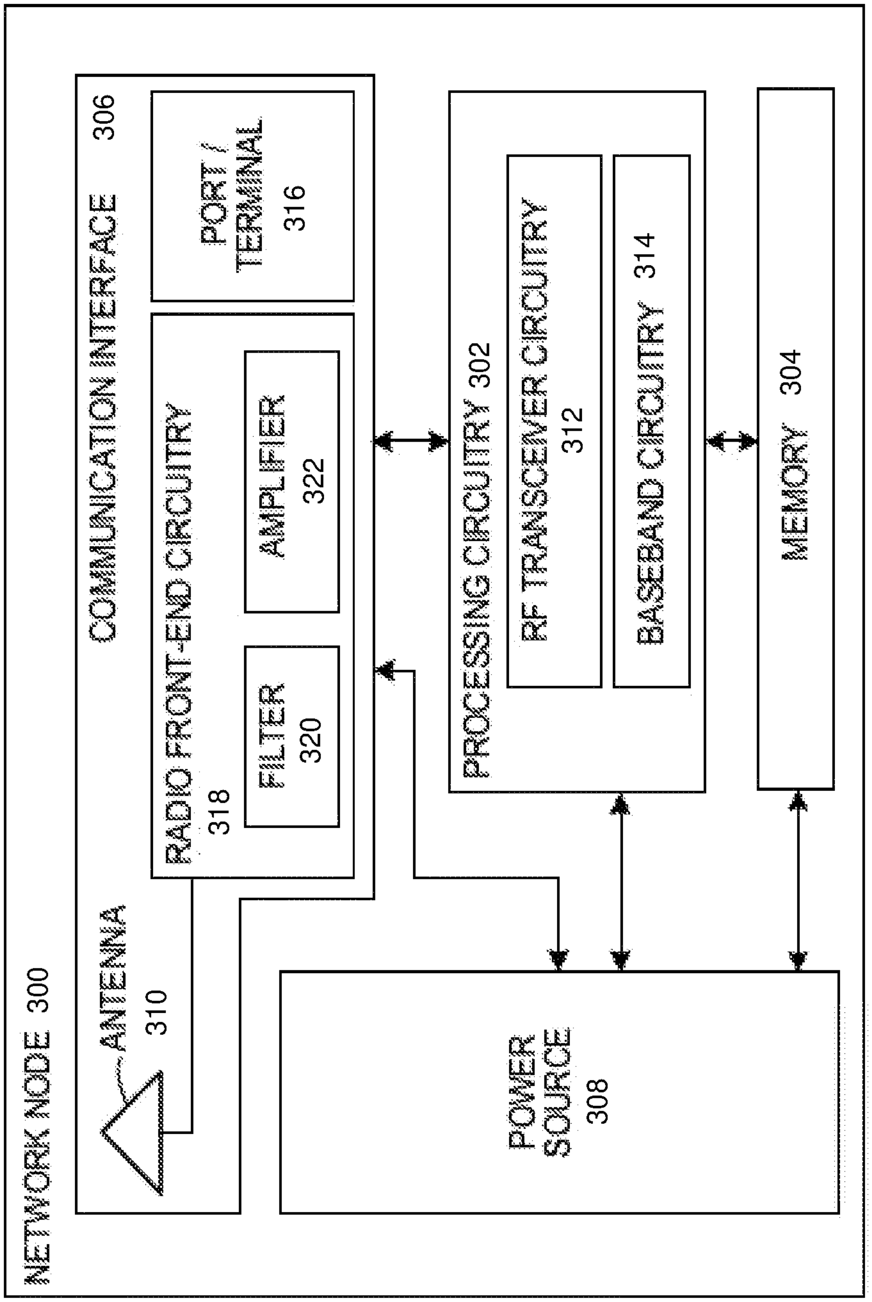
Figure 10:
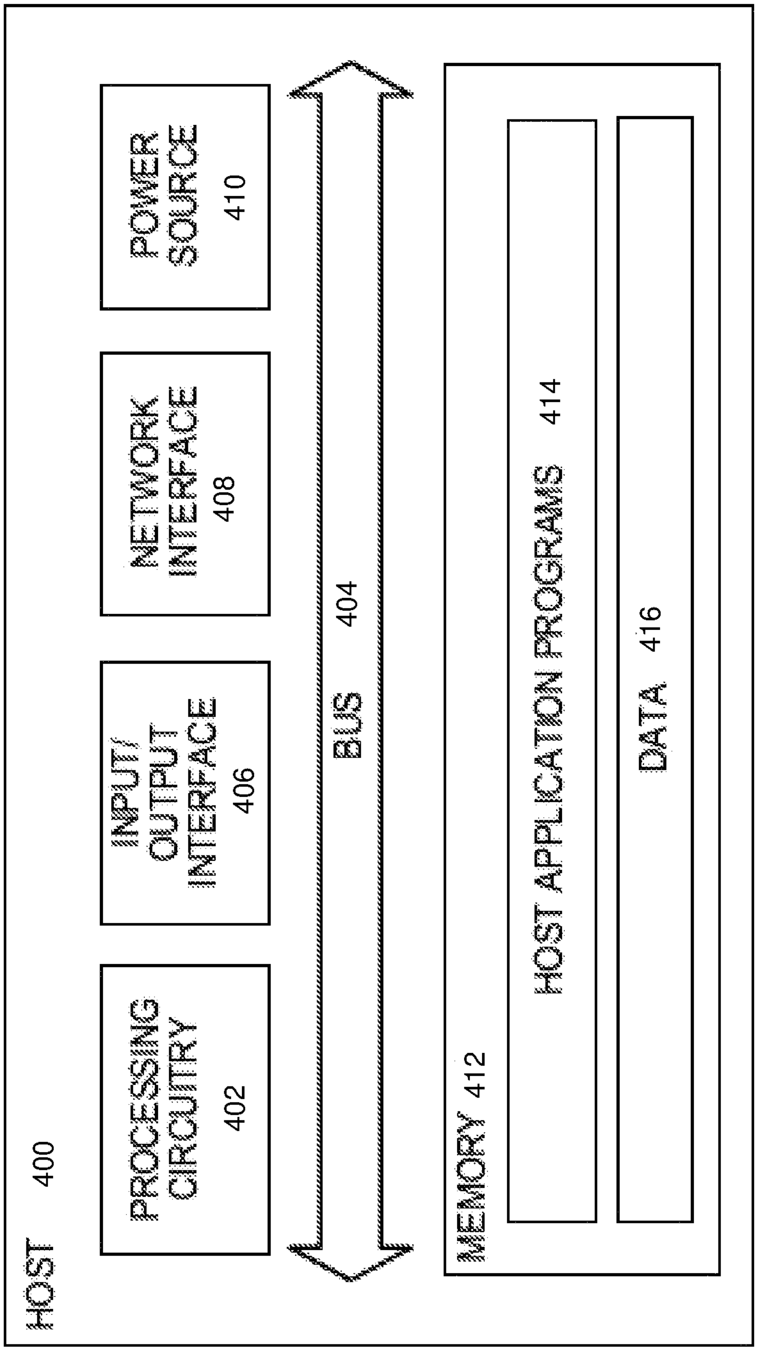
Figure 11:
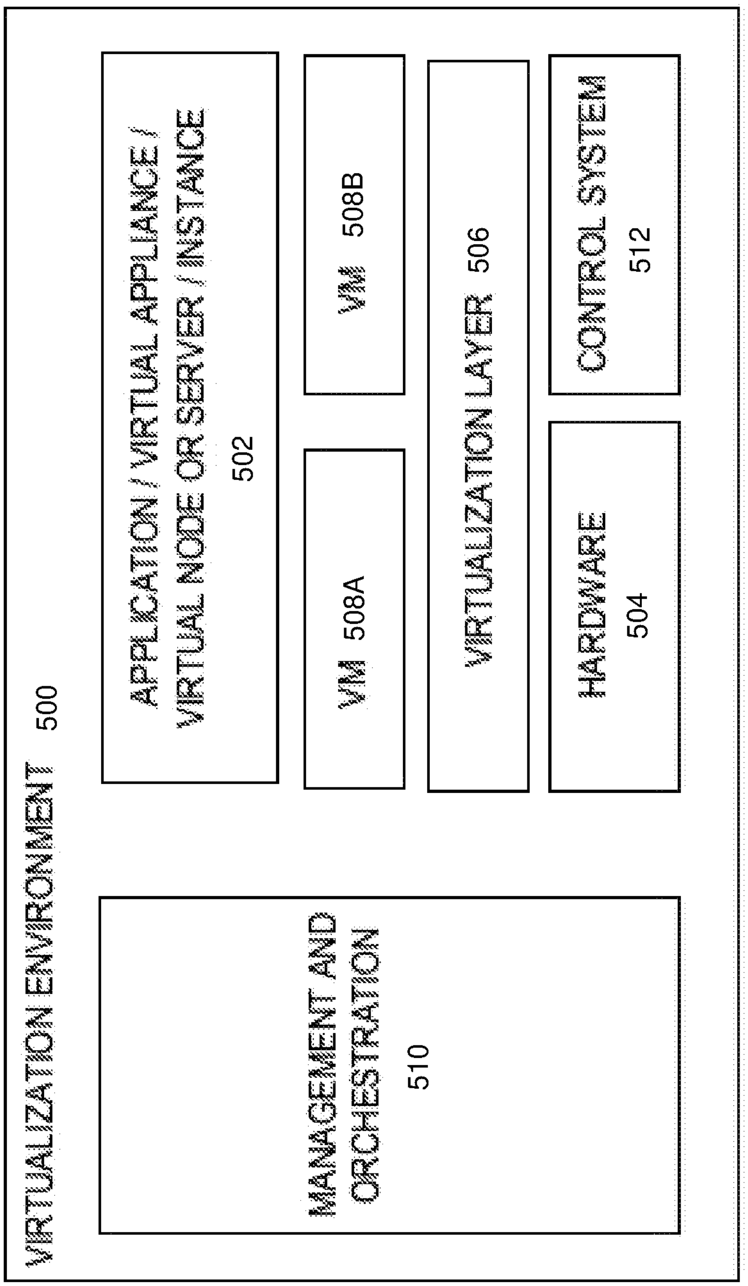
Figure 12:
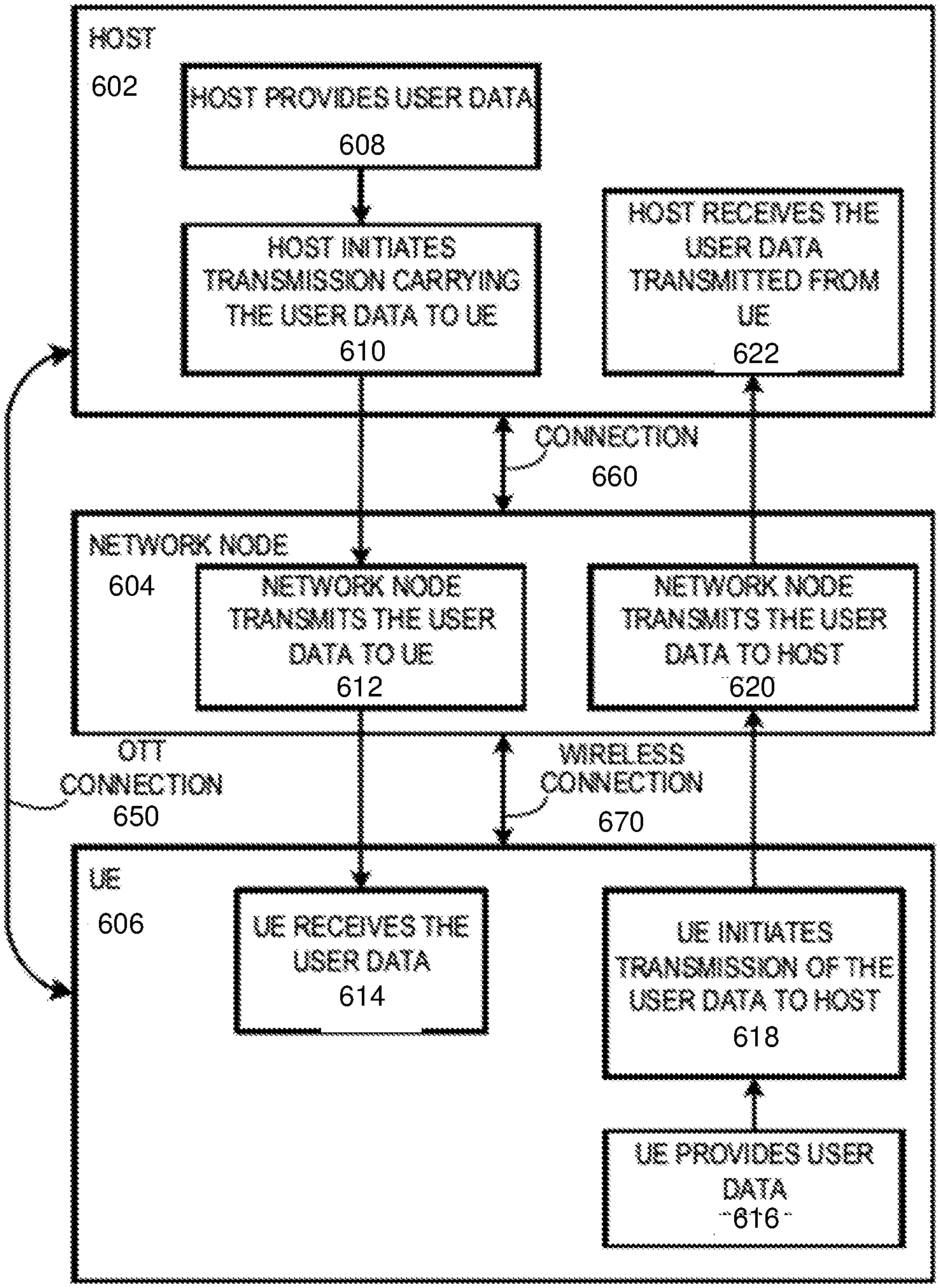
Figure 13:
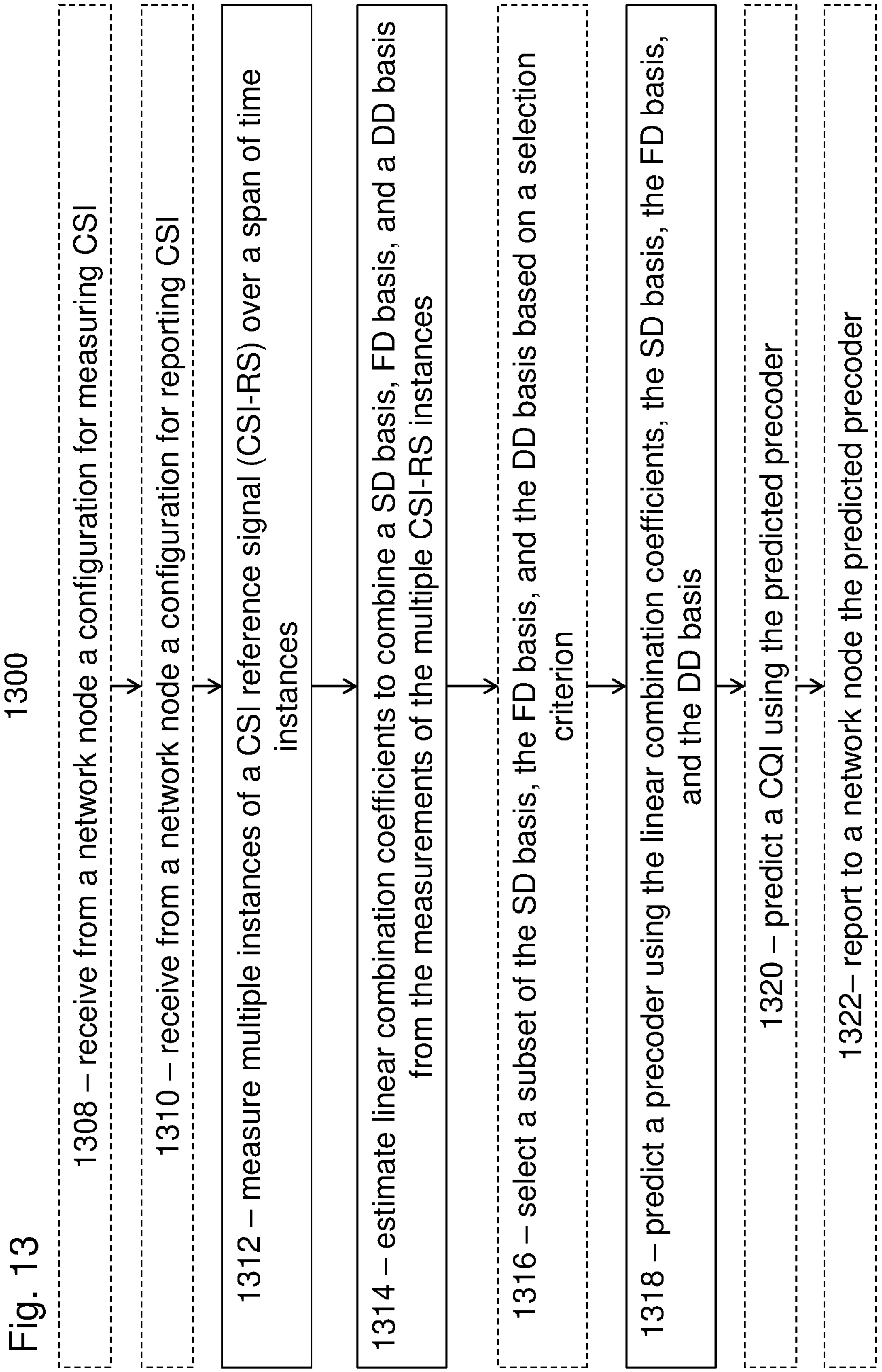
Figure 14:
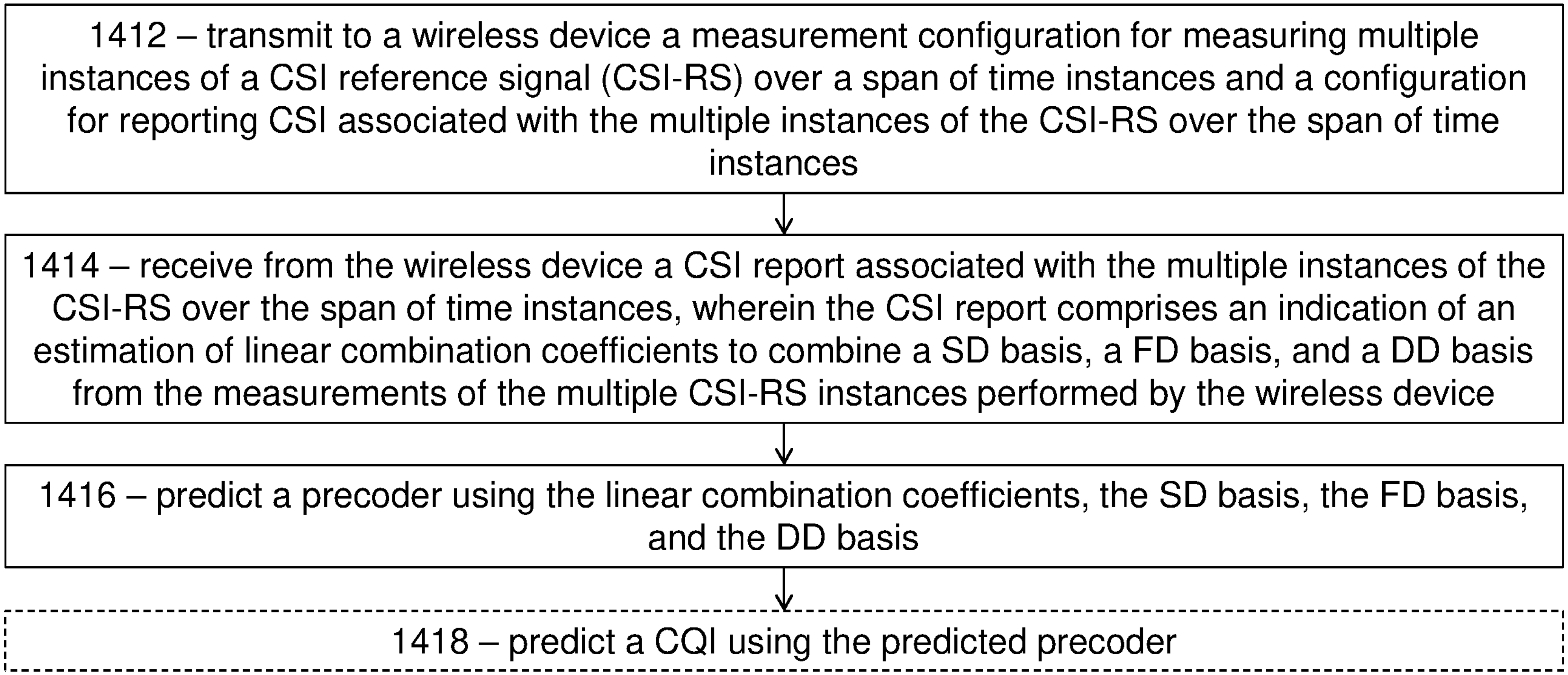

FIG. 7 illustrates an example communication system, according to certain embodiments;

FIG. 8 illustrates an example UE, according to certain embodiments;

FIG. 9 illustrates an example network node, according to certain embodiments;

FIG. 10 illustrates a block diagram of a host, according to certain embodiments;

FIG. 11 illustrates a virtualization environment in which functions implemented by some embodiments may be virtualized, according to certain embodiments;

FIG. 12 illustrates a host communicating via a network node with a UE over a partially wireless connection, according to certain embodiments;

FIG. 13 illustrates a method performed by a wireless device, according to certain embodiments; and FIG. 14 illustrates a method performed by a network node, according to certain embodiments.

DETAILED DESCRIPTION

As described above, certain challenges currently exist with channel state information (CSI) reporting for a type II precoder for user equipment (UE) travelling at high velocity. Certain aspects of the present disclosure and their embodiments may provide solutions to these or other challenges.

For example, particular embodiments include refinement of the Third Generation Partnership Project (3GPP) Type II codebooks that use Doppler domain information to make the channel state information (CSI) more useful for moving UEs. Particular embodiments are based on augmenting the Type II codebook structure by a Doppler domain (DD) compression matrix to capture the time variations of the channel. This also implies that the linear combination coefficient matrix becomes a three-dimensional matrix that combines the selected spatial domain (SD), frequency domain (FD), and DD basis vectors. Particular embodiments include methods to obtain the linear combination coefficient matrix and to predict a future precoder based on such a CSI report.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The Rel-16 Type II regular codebook has the following structure $$W = W_1 \tilde{W}_2 W_f^H,$$

where $W_1$ is a spatial domain (SD) compression matrix, $W_f$ is a frequency domain (FD) compression matrix, $\tilde{W}_2$ is a matrix of linear combination coefficients and $(\bullet)^H$ denotes the complex conjugate transpose of a matrix. The Rel-16 and Rel-17 Type II port selection codebooks have the same structure, but, in this case, $W_1$ is a port selection matrix.

The 3GPP Rel-18 MIMO evolution work item description proposes Rel-16/17 Type-II codebook refinement, without modification to the spatial and frequency domain basis. This implies that the $W_1$ and $W_f$ matrices should be considered fixed, i.e., they should not change over the time instances that are used for taking advantage of the time/Doppler-domain information. This may be motivated by the assumption that the angles and delays of channel clusters change relatively slowly with time. Thus, codebook refinement should capture the small-scale fading within the channel stationarity time.

To use time/Doppler-domain information, multiple CSI reference signal (CSI-RS) instances over time are needed to construct a CSI report. One example of multiple CSI-RS instances is illustrated in FIG. 3.

Figure 1:
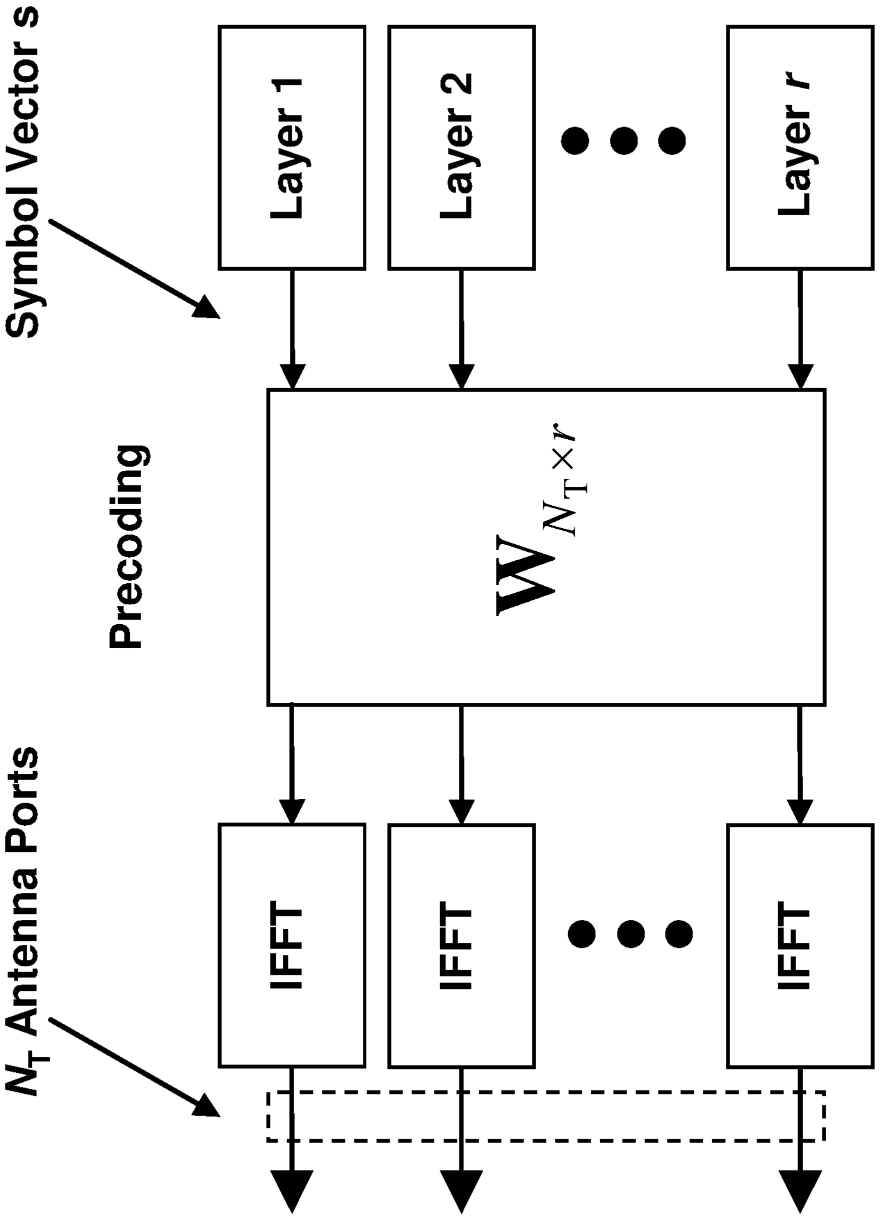
FIG. 1 is a block diagram illustrating a transmission structure of precoded spatial multiplexing mode in New Radio (NR)
Figure 2:
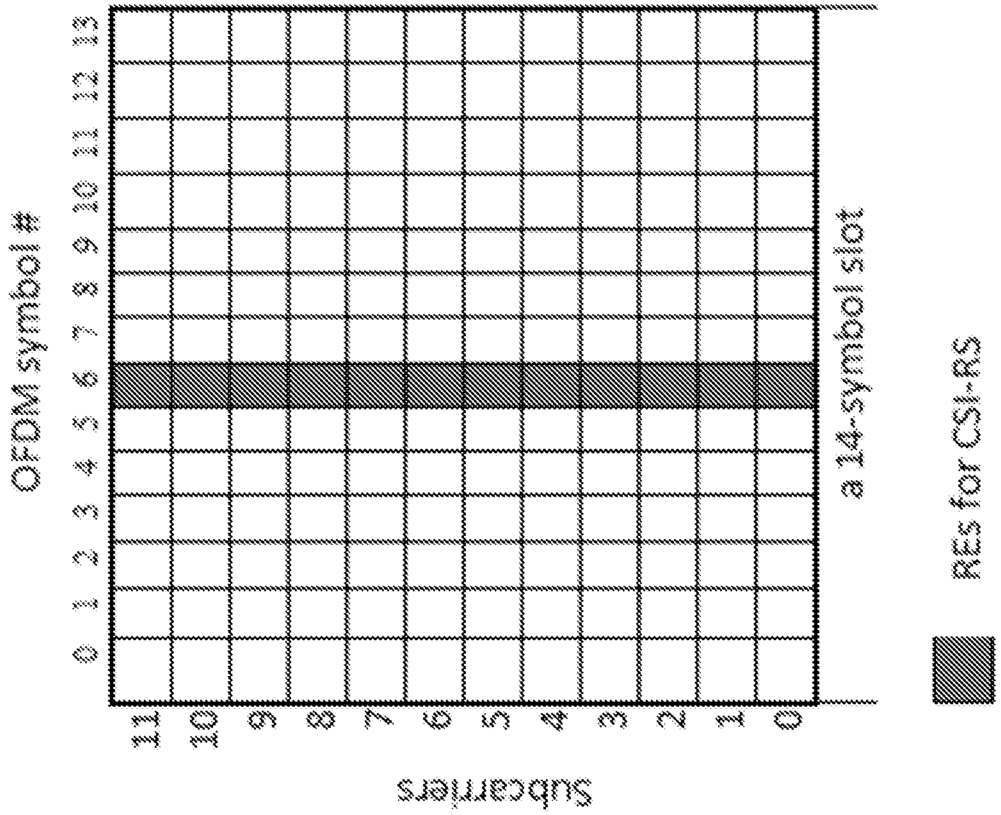
FIG. 2 is a time-frequency diagram illustrating an example of channel state information reference signal (CSI-RS) resource element (RE) allocation for a 12-port CSI-RS in NR.
Figure 3:
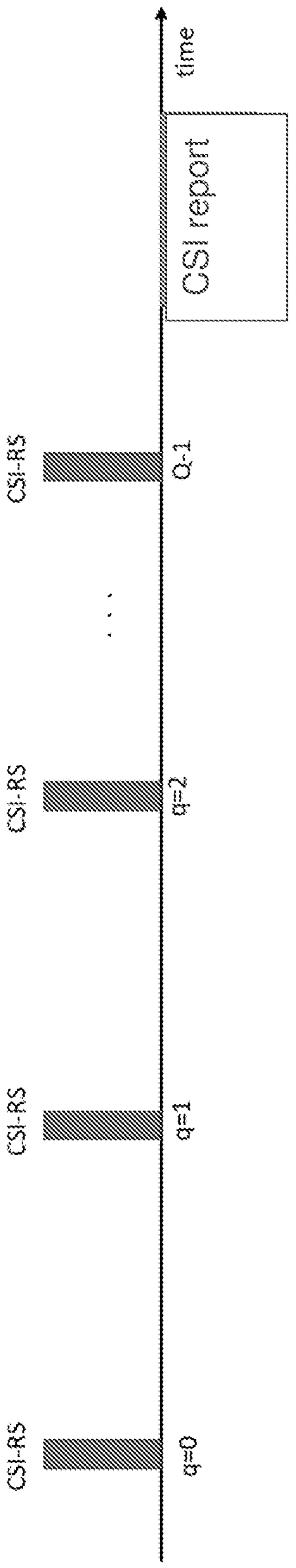
FIG. 3 is a timing diagram illustrating uniformly spaced multiple samples of CSI-RS.

FIG. 3 is a timing diagram illustrating uniformly spaced multiple samples of CSI-RS. A UE may use the multiple samples of CSI-RS to estimate the time-domain properties of the channel.

In some embodiments, let $$\tilde{W}_2^{[q]}$$

be the matrix of linear combining coefficients computed using the CSI-RS instance q, for all SD and FD basis vectors before discarding or quantizing any coefficients for feedback-overhead reduction.

In some embodiments, let $$\tilde{W}_2^{[q]}$$

be the matrix of linear combining coefficients computed using the CSI-RS instance q, for a selected subset of strongest SD and FD basis vectors before discarding or quantizing any coefficients for feedback-overhead reduction.

The coefficient matrices $$\tilde{W}_2^{[q]}$$

for q=0 to q=Q−1 could be fed back directly to the network. However, to reduce reporting overhead, particular embodiments compress these coefficient matrices using a Doppler domain (DD) basis. This may be seen as an extension of the spatial and frequency domain compression in the Rel-16 Type II codebook to also include DD compression.

Figure 4:
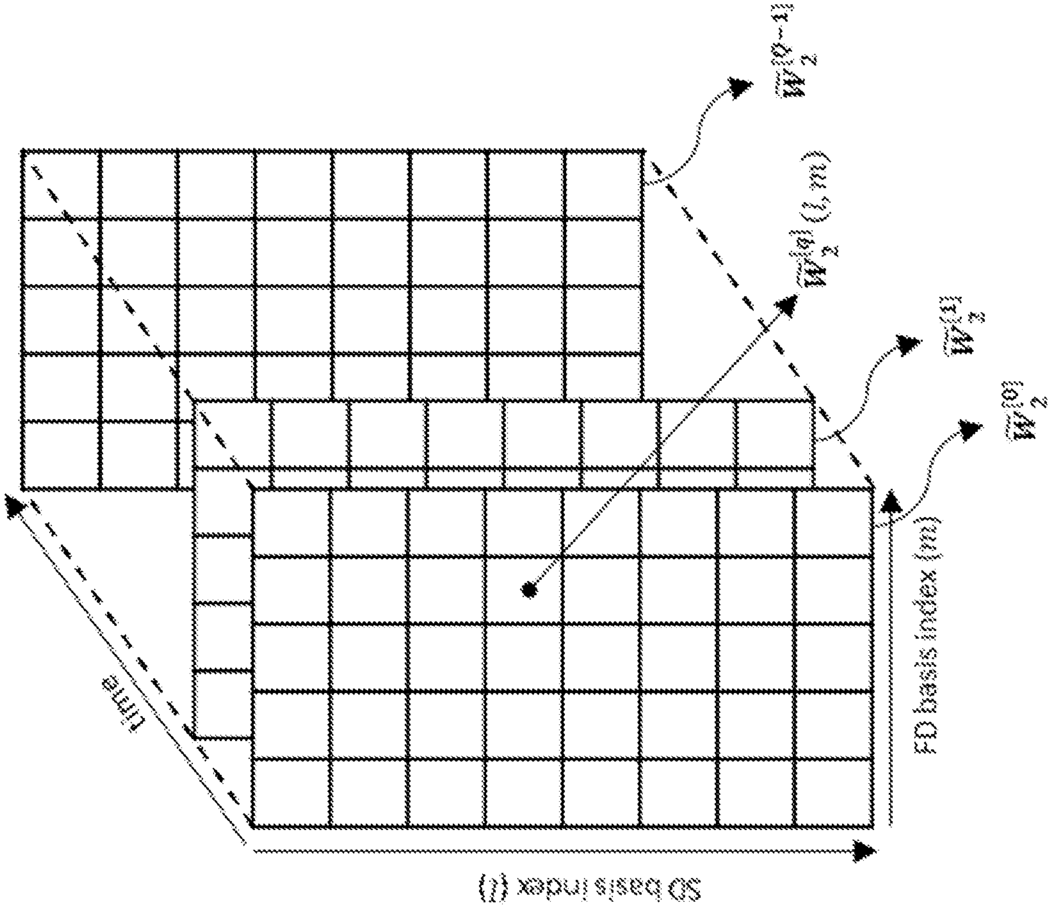
FIG. 4 illustrates the $$\tilde{W}_2^{[q]}$$

FIG. 4 illustrates the $$\tilde{W}_2^{[q]}$$

matrices, according to a particular embodiment. Let $$\tilde{W}_2^{[q]}$$

(l,m) denote the element in the l-th row and m-th column of the coefficient matrix $$\tilde{W}_2^{[q]}$$

which corresponds to the weight of the l-th SD basis and the m-th FD basis. FIG. 4 illustrates the $$\tilde{W}_2^{[q]}:$$

s stacked in the order of the CSI-RS instances they are computed from.

The time evolution of the coefficient $$\tilde{W}_2^{[q]}$$

(l,m) is captured by the vector $$v_{l,m} = \left[\tilde{W}_2^{[0]}(l, m), \tilde{W}_2^{[1]}(l, m), \tilde{W}_2^{[2]}(l, m), \ldots , \tilde{W}_2^{[Q-1]}(l, m)\right]^T.$$

Let $W_D$ denote a matrix where each column is a DD basis vector. In some embodiments, $W_D$ is a discrete Fourier transform (DFT) matrix of size Q×Q, where columns denote orthogonal DD basis vectors. The d-th column of $W_D$ has the form of $$\frac{1}{\sqrt{Q}}\left[1, e^{-j\frac{2\pi}{Q}d\cdot 1}, e^{-j\frac{2\pi}{Q}d\cdot 2}, \ldots , e^{-j\frac{2\pi}{Q}d\cdot(Q-1)}\right]^T.$$

In some embodiments, a UE computes $\overline{W}$, a three-dimensional coefficient matrix where elements denote the weights to combine the SD basis, the FD basis and the DD basis.

In some embodiments, the elements of $\overline{W}$ are computed, by a user node, as $\overline{W}$(l,m,d)=

$$v_{l,m}^T$$

$W_D$(:, d), where $W_D$(:, d) denotes the d-th column of the $W_D$ matrix, l is SD basis index, m is the FD basis index and d is the DD basis index.

FIG. 5 illustrates the three-dimensional coefficient matrix $\overline{W}$, according to particular embodiments.

In some embodiments, the CSI report, from a UE node, consists of $\overline{W}$, SD basis indices of $W_1$, FD basis indices of $W_f$, and DD basis indices of $W_D$.

In some embodiments, compression of $\overline{W}$ is performed by discarding the elements of $\overline{W}$ whose magnitude is below a threshold and reporting only the indices of the SD, FD and DD basis corresponding to the non-discarded elements. In a related embodiment, the UE feeds back along with the CSI report a bitmap indicating the elements of $\overline{W}$ that are non-discarded.

In some embodiments, a precoder $W_{pred}$ is constructed for a future time instance, at a network node, from $\overline{W}$.

In some embodiments, the precoder $W_{pred}$ is constructed, at a user node, from $\overline{W}$.

In some embodiments, the precoder $W_{pred}$ is used, at a user node, to determine channel quality indicator (CQI).

In some embodiments, the precoder $W_{pred}$ is predicted for a time separation Δt, which denotes the time difference or an estimated time difference between the reception of CSI-RS instance with index q=0 at the user node and the time at the prediction of the precoder $W_{pred}$, at a network node or a user node, from the SD basis indices, FD basis indices, DD basis indices, and $\overline{W}$ using the following operations.

Operation 1: Let $f_d$ denote the frequency of the continuous time equivalent of the d-th Doppler basis. Let $x_d(\Delta t)$ denote the d-th Doppler domain basis sampled at Δt, and it is given by $x_d(\Delta t)=e^{j2\pi f_d \Delta t}$.

Operation 2: Construct $\hat{W}_2(l,m)$ corresponding to Δt as $\hat{W}_2(l, m)=\alpha\forall_{\nabla d}\overline{W}(l,m,d)\, x_d(\Delta t)$, where α is a normalization factor to account for number of DD basis.

Operation 3: Construct $W_1$ and $$W_f^H$$

from the SD basis indices and FD basis indices, respectively. The predicted precoder is then given by $$W_{pred} = W_1 \hat{W}_2 W_f^H.$$

In some embodiments, Δt denotes the time difference between the reception of CSI-RS instance with index q=0 (or at the user node and the time at the prediction of the precoder $W_{pred}$ computed with the help of the timing advance information available at the network node.

In some embodiments, Δt denotes the time difference between the transmission of CSI-RS instance with index q=0 at the user node and the time at the prediction of the precoder $W_{pred}$.

In some embodiments, the precoder $W_{pred}$ is predicted, at a network node, for each orthogonal frequency division multiplexing (OFDM) symbol in the downlink transmission using a Δt that is equal to the time difference between the reception of CSI-RS instance with index q=0 and the starting time of the OFDM symbol.

If the spacing of the CSI-RS time samples is non-uniform, the Doppler basis vectors may be modified to match the sampling instants. Non-uniform spacing can be due to, e.g., aperiodic triggering of CSI-RS or limitations in possible periodic CSI-RS resource allocations. It can also be beneficial to have a non-uniform sparse sampling to reduce RS overhead and Doppler ambiguity problems.

If the Doppler basis is a DFT matrix, the k-th basis vector has elements $e^{-j2\pi kn/N}$, n=0, 1, . . . . N, if the sampling is uniform. Now, assume there is a uniform grid of N time samples {0, 1, 2, . . . , N−1} on which only a subset of Q samples are occupied by CSI-RS and let $n_q$ denote the time sample for the q-th CSI-RS time instance. Then the DFT basis vector needs to be modified to have elements $e^{-j2\pi k n_q/N}$, q=0, . . . , Q−1. For example, consider a case with four uniformly spaced bursts of a pair of CSI-RS. An example is illustrated in FIG. 6.

FIG. 6 is a timing diagram illustrating uniformly spaced bursts of a pair of CSI-RS. In the illustrated example, $n_q \in$ {0, 1, 6, 7, 12, 13, 18, 19}, Q=8 and N=20.

In some embodiments, the spacing of the CSI-RS time samples is non-uniform and the Doppler basis vectors are modified to match the sampling instants.

In some embodiments, when the Doppler domain basis is based on DFT vectors and the CSI-RS time samples are non-uniformly spaced, the DFT vectors are re-sampled over the indices corresponding to the CSI-RS time instances.

FIG. 7 illustrates an example of a communication system 100 in accordance with some embodiments. In the example, the communication system 100 includes a telecommunication network 102 that includes an access network 104, such as a radio access network (RAN), and a core network 106, which includes one or more core network nodes 108. The access network 104 includes one or more access network nodes, such as network nodes 110*a* and 110*b* (one or more of which may be generally referred to as network nodes 110), or any other similar 3rd Generation Partnership Project (3GPP) access node or non-3GPP access point. The network nodes 110 facilitate direct or indirect connection of user equipment (UE), such as by connecting UEs 112*a*, 112*b*, 112*c*, and 112*d* (one or more of which may be generally referred to as UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

In the depicted example, the core network 106 connects the network nodes 110 to one or more hosts, such as host 116. These connections may be direct or indirect via one or more intermediary networks or devices. In other examples, network nodes may be directly coupled to hosts. The core network 106 includes one more core network nodes (e.g., core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 116 may be under the ownership or control of a service provider other than an operator or provider of the access network 104 and/or the telecommunication network 102, and may be operated by the service provider or on behalf of the service provider. The host 116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 100 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 102 is a cellular network that implements 3GPP standardized features. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 112 are configured to transmit and/or receive information without direct human interaction. For instance, a UE may be designed to transmit information to the access network 104 on a predetermined schedule, when triggered by an internal or external event, or in response to requests from the access network 104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 114 communicates with the access network 104 to facilitate indirect communication between one or more UEs (e.g., UE 112*c* and/or 112*d*) and network nodes (e.g., network node 110*b*). In some examples, the hub 114 may be a controller, router, content source and analytics, or any of the other communication devices described herein regarding UEs. For example, the hub 114 may be a broadband router enabling access to the core network 106 for the UEs. As another example, the hub 114 may be a controller that sends commands or instructions to one or more actuators in the UEs. Commands or instructions may be received from the UEs, network nodes 110, or by executable code, script, process, or other instructions in the hub 114. As another example, the hub 114 may be a data collector that acts as temporary storage for UE data and, in some embodiments, may perform analysis or other processing of the data. As another example, the hub 114 may be a content source. For example, for a UE that is a VR headset, display, loudspeaker or other media delivery device, the hub 114 may retrieve VR assets, video, audio, or other media or data related to sensory information via a network node, which the hub 114 then provides to the UE either directly, after performing local processing, and/or after adding additional local content. In still another example, the hub 114 acts as a proxy server or orchestrator for the UEs, in particular in if one or more of the UEs are low energy IoT devices.

The hub 114 may have a constant/persistent or intermittent connection to the network node 110*b*. The hub 114 may also allow for a different communication scheme and/or schedule between the hub 114 and UEs (e.g., UE 112*c* and/or 112*d*), and between the hub 114 and the core network 106. In other examples, the hub 114 is connected to the core network 106 and/or one or more UEs via a wired connection. Moreover, the hub 114 may be configured to connect to an M2M service provider over the access network 104 and/or to another UE over a direct connection. In some scenarios, UEs may establish a wireless connection with the network nodes 110 while still connected via the hub 114 via a wired or wireless connection. In some embodiments, the hub 114 may be a dedicated hub—that is, a hub whose primary function is to route communications to/from the UEs from/to the network node 110*b*. In other embodiments, the hub 114 may be a non-dedicated hub—that is, a device which is capable of operating to route communications between the UEs and network node 110*b*, but which is additionally capable of operating as a communication start and/or end point for certain data channels.

FIG. 8 shows a UE 200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 200 includes processing circuitry 202 that is operatively coupled via a bus 204 to an input/output interface 206, a power source 208, a memory 210, a communication interface 212, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 202 is configured to process instructions and data and may be configured to implement any sequential state machine operative to execute instructions stored as machine-readable computer programs in the memory 210. The processing circuitry 202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 202 may include multiple central processing units (CPUs).

In the example, the input/output interface 206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 208 is structured as a battery or battery pack. Other types of power sources, such as an external power source (e.g., an electricity outlet), photovoltaic device, or power cell, may be used. The power source 208 may further include power circuitry for delivering power from the power source 208 itself, and/or an external power source, to the various parts of the UE 200 via input circuitry or an interface such as an electrical power cable. Delivering power may be, for example, for charging of the power source 208. Power circuitry may perform any formatting, converting, or other modification to the power from the power source 208 to make the power suitable for the respective components of the UE 200 to which power is supplied.

The memory 210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 210 includes one or more application programs 214, such as an operating system, web browser application, a widget, gadget engine, or other application, and corresponding data 216. The memory 210 may store, for use by the UE 200, any of a variety of various operating systems or combinations of operating systems.

The memory 210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 210 may allow the UE 200 to access instructions, application programs and the like, stored on transitory or non-transitory memory media, to off-load data, or to upload data. An article of manufacture, such as one utilizing a communication system may be tangibly embodied as or in the memory 210, which may be or comprise a device-readable storage medium.

The processing circuitry 202 may be configured to communicate with an access network or other network using the communication interface 212. The communication interface 212 may comprise one or more communication subsystems and may include or be communicatively coupled to an antenna 222. The communication interface 212 may include one or more transceivers used to communicate, such as by communicating with one or more remote transceivers of another device capable of wireless communication (e.g., another UE or a network node in an access network). Each transceiver may include a transmitter 218 and/or a receiver 220 appropriate to provide network communications (e.g., optical, electrical, frequency allocations, and so forth). Moreover, the transmitter 218 and receiver 220 may be coupled to one or more antennas (e.g., antenna 222) and may share circuit components, software or firmware, or alternatively be implemented separately.

In the illustrated embodiment, communication functions of the communication interface 212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 200 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

FIG. 9 shows a network node 300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 300 includes a processing circuitry 302, a memory 304, a communication interface 306, and a power source 308. The network node 300 may be composed of multiple physically separate components (e.g., a NodeB component and a RNC component, or a BTS component and a BSC component, etc.), which may each have their own respective components. In certain scenarios in which the network node 300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 300 may be configured to support multiple radio access technologies (RATs). In such embodiments, some components may be duplicated (e.g., separate memory 304 for different RATs) and some components may be reused (e.g., a same antenna 310 may be shared by different RATs). The network node 300 may also include multiple sets of the various illustrated components for different wireless technologies integrated into network node 300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 300.

The processing circuitry 302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 300 components, such as the memory 304, to provide network node 300 functionality.

In some embodiments, the processing circuitry 302 includes a system on a chip (SOC). In some embodiments, the processing circuitry 302 includes one or more of radio frequency (RF) transceiver circuitry 312 and baseband processing circuitry 314. In some embodiments, the radio frequency (RF) transceiver circuitry 312 and the baseband processing circuitry 314 may be on separate chips (or sets of chips), boards, or units, such as radio units and digital units. In alternative embodiments, part or all of RF transceiver circuitry 312 and baseband processing circuitry 314 may be on the same chip or set of chips, boards, or units.

The memory 304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 302. The memory 304 may store any suitable instructions, data, or information, including a computer program, software, an application including one or more of logic, rules, code, tables, and/or other instructions capable of being executed by the processing circuitry 302 and utilized by the network node 300. The memory 304 may be used to store any calculations made by the processing circuitry 302 and/or any data received via the communication interface 306. In some embodiments, the processing circuitry 302 and memory 304 is integrated.

The communication interface 306 is used in wired or wireless communication of signaling and/or data between a network node, access network, and/or UE. As illustrated, the communication interface 306 comprises port(s)/terminal(s) 316 to send and receive data, for example to and from a network over a wired connection. The communication interface 306 also includes radio front-end circuitry 318 that may be coupled to, or in certain embodiments a part of, the antenna 310. Radio front-end circuitry 318 comprises filters 320 and amplifiers 322. The radio front-end circuitry 318 may be connected to an antenna 310 and processing circuitry 302. The radio front-end circuitry may be configured to condition signals communicated between antenna 310 and processing circuitry 302. The radio front-end circuitry 318 may receive digital data that is to be sent out to other network nodes or UEs via a wireless connection. The radio front-end circuitry 318 may convert the digital data into a radio signal having the appropriate channel and bandwidth parameters using a combination of filters 320 and/or amplifiers 322. The radio signal may then be transmitted via the antenna 310. Similarly, when receiving data, the antenna 310 may collect radio signals which are then converted into digital data by the radio front-end circuitry 318. The digital data may be passed to the processing circuitry 302. In other embodiments, the communication interface may comprise different components and/or different combinations of components.

In certain alternative embodiments, the network node 300 does not include separate radio front-end circuitry 318, instead, the processing circuitry 302 includes radio front-end circuitry and is connected to the antenna 310. Similarly, in some embodiments, all or some of the RF transceiver circuitry 312 is part of the communication interface 306. In still other embodiments, the communication interface 306 includes one or more ports or terminals 316, the radio front-end circuitry 318, and the RF transceiver circuitry 312, as part of a radio unit (not shown), and the communication interface 306 communicates with the baseband processing circuitry 314, which is part of a digital unit (not shown).

The antenna 310 may include one or more antennas, or antenna arrays, configured to send and/or receive wireless signals. The antenna 310 may be coupled to the radio front-end circuitry 318 and may be any type of antenna capable of transmitting and receiving data and/or signals wirelessly. In certain embodiments, the antenna 310 is separate from the network node 300 and connectable to the network node 300 through an interface or port.

The antenna 310, communication interface 306, and/or the processing circuitry 302 may be configured to perform any receiving operations and/or certain obtaining operations described herein as being performed by the network node. Any information, data and/or signals may be received from a UE, another network node and/or any other network equipment. Similarly, the antenna 310, the communication interface 306, and/or the processing circuitry 302 may be configured to perform any transmitting operations described herein as being performed by the network node. Any information, data and/or signals may be transmitted to a UE, another network node and/or any other network equipment.

The power source 308 provides power to the various components of network node 300 in a form suitable for the respective components (e.g., at a voltage and current level needed for each respective component). The power source 308 may further comprise, or be coupled to, power management circuitry to supply the components of the network node 300 with power for performing the functionality described herein. For example, the network node 300 may be connectable to an external power source (e.g., the power grid, an electricity outlet) via an input circuitry or interface such as an electrical cable, whereby the external power source supplies power to power circuitry of the power source 308. As a further example, the power source 308 may comprise a source of power in the form of a battery or battery pack which is connected to, or integrated in, power circuitry. The battery may provide backup power should the external power source fail.

Embodiments of the network node 300 may include additional components beyond those shown in FIG. 9 for providing certain aspects of the network node's functionality, including any of the functionality described herein and/or any functionality necessary to support the subject matter described herein. For example, the network node 300 may include user interface equipment to allow input of information into the network node 300 and to allow output of information from the network node 300. This may allow a user to perform diagnostic, maintenance, repair, and other administrative functions for the network node 300.

FIG. 10 is a block diagram of a host 400, which may be an embodiment of the host 116 of FIG. 7, in accordance with various aspects described herein. As used herein, the host 400 may be or comprise various combinations hardware and/or software, including a standalone server, a blade server, a cloud-implemented server, a distributed server, a virtual machine, container, or processing resources in a server farm. The host 400 may provide one or more services to one or more UEs.

The host 400 includes processing circuitry 402 that is operatively coupled via a bus 404 to an input/output interface 406, a network interface 408, a power source 410, and a memory 412. Other components may be included in other embodiments. Features of these components may be substantially similar to those described with respect to the devices of previous figures, such as FIGS. 3 and 4, such that the descriptions thereof are generally applicable to the corresponding components of host 400.

The memory 412 may include one or more computer programs including one or more host application programs 414 and data 416, which may include user data, e.g., data generated by a UE for the host 400 or data generated by the host 400 for a UE. Embodiments of the host 400 may utilize only a subset or all of the components shown. The host application programs 414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 414 may also provide for user authentication and licensing checks and may periodically report health, routes, and content availability to a central node, such as a device in or on the edge of a core network. Accordingly, the host 400 may select and/or indicate a different host for over-the-top services for a UE. The host application programs 414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

FIG. 11 is a block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 506 (also referred to as hypervisors or virtual machine monitors (VMMs)), provide VMs 508*a* and 508*b* (one or more of which may be generally referred to as VMs 508), and/or perform any of the functions, features and/or benefits described in relation with some embodiments described herein. The virtualization layer 506 may present a virtual operating platform that appears like networking hardware to the VMs 508.

The VMs 508 comprise virtual processing, virtual memory, virtual networking or interface and virtual storage, and may be run by a corresponding virtualization layer 506. Different embodiments of the instance of a virtual appliance 502 may be implemented on one or more of VMs 508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 508 may be a software implementation of a physical machine that runs programs as if they were executing on a physical, non-virtualized machine. Each of the VMs 508, and that part of hardware 504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 508 on top of the hardware 504 and corresponds to the application 502.

Hardware 504 may be implemented in a standalone network node with generic or specific components. Hardware 504 may implement some functions via virtualization. Alternatively, hardware 504 may be part of a larger cluster of hardware (e.g. such as in a data center or CPE) where many hardware nodes work together and are managed via management and orchestration 510, which, among others, oversees lifecycle management of applications 502. In some embodiments, hardware 504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 512 which may alternatively be used for communication between hardware nodes and radio units.

FIG. 12 shows a communication diagram of a host 602 communicating via a network node 604 with a UE 606 over a partially wireless connection in accordance with some embodiments. Example implementations, in accordance with various embodiments, of the UE (such as a UE 112*a* of FIG. 7 and/or UE 200 of FIG. 8), network node (such as network node 110*a* of FIG. 7 and/or network node 300 of FIG. 9), and host (such as host 116 of FIG. 7 and/or host 400 of FIG. 10) discussed in the preceding paragraphs will now be described with reference to FIG. 12.

Like host 400, embodiments of host 602 include hardware, such as a communication interface, processing circuitry, and memory. The host 602 also includes software, which is stored in or accessible by the host 602 and executable by the processing circuitry. The software includes a host application that may be operable to provide a service to a remote user, such as the UE 606 connecting via an over-the-top (OTT) connection 650 extending between the UE 606 and host 602. In providing the service to the remote user, a host application may provide user data which is transmitted using the OTT connection 650.

The network node 604 includes hardware enabling it to communicate with the host 602 and UE 606. The connection 660 may be direct or pass through a core network (like core network 106 of FIG. 7) and/or one or more other intermediate networks, such as one or more public, private, or hosted networks. For example, an intermediate network may be a backbone network or the Internet.

The UE 606 includes hardware and software, which is stored in or accessible by UE 606 and executable by the UE's processing circuitry. The software includes a client application, such as a web browser or operator-specific "app" that may be operable to provide a service to a human or non-human user via UE 606 with the support of the host 602. In the host 602, an executing host application may communicate with the executing client application via the OTT connection 650 terminating at the UE 606 and host 602. In providing the service to the user, the UE's client application may receive request data from the host's host application and provide user data in response to the request data. The OTT connection 650 may transfer both the request data and the user data. The UE's client application may interact with the user to generate the user data that it provides to the host application through the OTT connection 650.

The OTT connection 650 may extend via a connection 660 between the host 602 and the network node 604 and via a wireless connection 670 between the network node 604 and the UE 606 to provide the connection between the host 602 and the UE 606. The connection 660 and wireless connection 670, over which the OTT connection 650 may be provided, have been drawn abstractly to illustrate the communication between the host 602 and the UE 606 via the network node 604, without explicit reference to any intermediary devices and the precise routing of messages via these devices.

As an example of transmitting data via the OTT connection 650, in operation 608, the host 602 provides user data, which may be performed by executing a host application. In some embodiments, the user data is associated with a particular human user interacting with the UE 606. In other embodiments, the user data is associated with a UE 606 that shares data with the host 602 without explicit human interaction. In operation 610, the host 602 initiates a transmission carrying the user data towards the UE 606. The host 602 may initiate the transmission responsive to a request transmitted by the UE 606. The request may be caused by human interaction with the UE 606 or by operation of the client application executing on the UE 606. The transmission may pass via the network node 604, in accordance with the teachings of the embodiments described throughout this disclosure. Accordingly, in operation 612, the network node 604 transmits to the UE 606 the user data that was carried in the transmission that the host 602 initiated, in accordance with the teachings of the embodiments described throughout this disclosure. In operation 614, the UE 606 receives the user data carried in the transmission, which may be performed by a client application executed on the UE 606 associated with the host application executed by the host 602.

In some examples, the UE 606 executes a client application which provides user data to the host 602. The user data may be provided in reaction or response to the data received from the host 602. Accordingly, in operation 616, the UE 606 may provide user data, which may be performed by executing the client application. In providing the user data, the client application may further consider user input received from the user via an input/output interface of the UE 606. Regardless of the specific manner in which the user data was provided, the UE 606 initiates, in operation 618, transmission of the user data towards the host 602 via the network node 604. In operation 620, in accordance with the teachings of the embodiments described throughout this disclosure, the network node 604 receives user data from the UE 606 and initiates transmission of the received user data towards the host 602. In operation 622, the host 602 receives the user data carried in the transmission initiated by the UE 606.

One or more of the various embodiments improve the performance of OTT services provided to the UE 606 using the OTT connection 650, in which the wireless connection 670 forms the last segment. More precisely, the teachings of these embodiments may improve the delay to directly activate an SCell by RRC and power consumption of user equipment and thereby provide benefits such as reduced user waiting time and extended battery lifetime.

In an example scenario, factory status information may be collected and analyzed by the host 602. As another example, the host 602 may process audio and video data which may have been retrieved from a UE for use in creating maps. As another example, the host 602 may collect and analyze real-time data to assist in controlling vehicle congestion (e.g., controlling traffic lights). As another example, the host 602 may store surveillance video uploaded by a UE. As another example, the host 602 may store or control access to media content such as video, audio, VR or AR which it can broadcast, multicast or unicast to UEs. As other examples, the host 602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 650 between the host 602 and UE 606, in response to variations in the measurement results. The measurement procedure and/or the network functionality for reconfiguring the OTT connection may be implemented in software and hardware of the host 602 and/or UE 606. In some embodiments, sensors (not shown) may be deployed in or in association with other devices through which the OTT connection 650 passes; the sensors may participate in the measurement procedure by supplying values of the monitored quantities exemplified above, or supplying values of other physical quantities from which software may compute or estimate the monitored quantities. The reconfiguring of the OTT connection 650 may include message format, retransmission settings, preferred routing etc.; the reconfiguring need not directly alter the operation of the network node 604. Such procedures and functionalities may be known and practiced in the art. In certain embodiments, measurements may involve proprietary UE signaling that facilitates measurements of throughput, propagation times, latency and the like, by the host 602. The measurements may be implemented in that software causes messages to be transmitted, in particular empty or 'dummy' messages, using the OTT connection 650 while monitoring propagation times, errors, etc.

FIG. 13 is a flowchart illustrating an example method in a wireless device, according to certain embodiments. In particular embodiments, one or more operations of FIG. 13 may be performed by UE 200 described with respect to FIG. 8. The wireless device is capable of CSI reporting.

The method may begin at operation 1308, where the wireless device (e.g., UE 200) receives from a network node a measurement configuration for measuring the multiple instances of the CSI-RS over a span of time instances. At operation 1310, the wireless device may receive a configuration for reporting CSI associated with the multiple instances of the CSI-RS over the span of time instances.

At operation 1312, the wireless device measures multiple instances of a CSI-RS over a span of time instances. The wireless device may measure according to the received measurement configuration.

At operation 1314, the wireless device estimates linear combination coefficients to combine a spatial domain (SD) basis, a frequency domain (FD) basis, and a Doppler domain (DD) basis from the measurements of the multiple CSI-RS instances. The wireless device may perform the estimation according to any of the embodiments and examples described herein.

In particular embodiments, the linear combination coefficients are represented by a three-dimensional matrix where elements of the three-dimensional matrix denote weights to use to combine the SD basis, the FD basis, and the DD basis.

In particular embodiments, the multiple instances of the CSI-RS are uniformly spaced in time. In particular embodiments, the multiple instances of the CSI-RS are not uniformly spaced in time and Doppler basis vectors are modified to match the measurement instances.

In some embodiments, at operation 1316, the wireless device may select a subset of the SD basis, the FD basis, and the DD basis based on a selection criterion, At operation 1318, the wireless device predicts a precoder using the linear combination coefficients, the SD basis, the FD basis, and the DD basis, or the optional selected subsets. The wireless device may perform the prediction according to any of the embodiments and examples described herein.

In some embodiments, at operation 1320, the wireless device predicts a channel quality indicator (CQI) using the predicted precoder.

At operation 1322, the wireless device reports to a network node any one or more of the predicted precoder, an indication of the SD basis, FD basis, DD basis and the corresponding linear combination coefficients, and/or the predicted CQI.

Modifications, additions, or omissions may be made to method 1300 of FIG. 13. Additionally, one or more operations in the method of FIG. 13 may be performed in parallel or in any suitable order.

FIG. 14 is a flowchart illustrating an example method in a network node, according to certain embodiments. In particular embodiments, one or more operations of FIG. 14 may be performed by network node 300 described with respect to FIG. 9. The network node is operable to configuring a wireless device for CSI reporting.

The method begins at operation 1412, where the network node (e.g., network node 300) transmits to a wireless device (e.g., UE 200) a measurement configuration for measuring multiple instances of a CSI-RS over a span of time instances and a configuration for reporting CSI associated with the multiple instances of the CSI-RS over the span of time instances.

At operation 1414, the network node receives from the wireless device a CSI report associated with the multiple instances of the CSI-RS over the span of time instances. The CSI report comprises an indication of an estimation of linear combination coefficients to combine a SD basis, a FD basis, and a DD basis from the measurements of the multiple CSI-RS instances performed by the wireless device.

In particular embodiments, the linear combination coefficients are represented by a three-dimensional matrix where elements of the three-dimensional matrix denote weights to use to combine the SD basis, the FD basis, and the DD basis.

In particular embodiments, the multiple instances of the CSI-RS are uniformly spaced in time. In particular embodiments, the multiple instances of the CSI-RS are not uniformly spaced in time and Doppler basis vectors were modified to match the measurement instances.

At operation 1416, the network node predicts a precoder using the linear combination coefficients, the SD basis, the FD basis, and the DD basis. The network node may predict the precoder according to any of the embodiments and examples described herein.

In particular embodiments, at operation 1418, the network node predicts a channel quality indicator (CQI) using the predicted precoder.

Modifications, additions, or omissions may be made to method 1400 of FIG. 14. Additionally, one or more operations in the method of FIG. 14 may be performed in parallel or in any suitable order.

Modifications, additions, or omissions may be made to the methods disclosed herein without departing from the scope of the invention. The methods may include more, fewer, or other operations. Additionally, operations may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device for channel state information (CSI) reporting, the method comprising:

measuring multiple instances of a CSI reference signal (CSI-RS) over a span of time instances;

estimating linear combination coefficients to combine a spatial domain (SD) basis, a frequency domain (FD) basis, and a Doppler domain (DD) basis from the measured multiple instances of the CSI-RS; and predicting a precoder utilizing the estimated linear combination coefficients, the SD basis, the FD basis, and the DD basis.

2. The method of claim 1, further comprising reporting to a network node the predicted precoder.

3. The method of claim 1, further comprising reporting to a network node an indication of the SD basis, FD basis, DD basis and the estimated linear combination coefficients.

4. The method of claim 1, further comprising:

predicting a channel quality indicator (CQI) utilizing the predicted precoder; and reporting to a network node the predicted CQI.

5. The method of claim 1, further comprising:

selecting a subset of the SD basis, the FD basis, and the DD basis based on a selection criterion, wherein predicting the precoder is based on the selected subset; and reporting to a network node the selected subset of the SD basis, the FD basis, and the DD basis.

6. The method of claim 1, wherein the linear combination coefficients are represented by a three-dimensional matrix where elements of the three-dimensional matrix denote weights to utilize to combine the SD basis, the FD basis, and the DD basis.

7. The method of claim 1, wherein the multiple instances of the CSI-RS are uniformly spaced in time.

8. The method of claim 1, wherein the multiple instances of the CSI-RS are not uniformly spaced in time and Doppler basis vectors are modified to match the multiple instances.

9. The method of claim 1, further comprising receiving from a network node a measurement configuration for measuring the multiple instances of the CSI-RS over the span of time instances.

10. The method of claim 1, further comprising receiving from a network node a configuration for reporting CSI associated with the multiple instances of the CSI-RS over the span of time instances.

11. A wireless device comprising processing circuitry operable to:

measure multiple instances of a channel state information (CSI) reference signal (CSI-RS) over a span of time instances;

estimate linear combination coefficients to combine a spatial domain (SD) basis, a frequency domain (FD) basis, and a Doppler domain (DD) basis from the measured multiple instances of the CSI-RS; and predict a precoder utilizing the estimated linear combination coefficients, the SD basis, the FD basis, and the DD basis.

12. A method performed by a network node for configuring a wireless device for channel state information (CSI) reporting, the method comprising:

transmitting to a wireless device a measurement configuration for measuring multiple instances of a CSI reference signal (CSI-RS) over a span of time instances and a configuration for reporting CSI associated with the multiple instances of the CSI-RS over the span of time instances, receiving from the wireless device a CSI report associated with the multiple instances of the CSI-RS over the span of time instances, wherein the CSI report comprises an indication of an estimation of linear combination coefficients to combine a spatial domain (SD) basis, a frequency domain (FD) basis, and a Doppler domain (DD) basis from the measured multiple instances of the CSI-RS performed by the wireless device; and predicting a precoder utilizing the estimated linear combination coefficients, the SD basis, the FD basis, and the DD basis.

13. The method of claim 12, further comprising predicting a channel quality indicator (CQI) utilizing the predicted precoder.

14. The method of claim 12, wherein the linear combination coefficients are represented by a three-dimensional matrix where elements of the three-dimensional matrix denote weights to utilize to combine the SD basis, the FD basis, and the DD basis.

15. The method of claim 12, wherein the multiple instances of the CSI-RS are uniformly spaced in time.

16. The method of claim 12, wherein the multiple instances of the CSI-RS are not uniformly spaced in time and Doppler basis vectors are modified to match the multiple instances.

17. A network node comprising processing circuitry operable to:

transmit to a wireless device a measurement configuration for measuring multiple instances of a CSI reference signal (CSI-RS) over a span of time instances and a configuration for reporting CSI associated with the multiple instances of the CSI-RS over the span of time instances, receive from the wireless device a CSI report associated with the multiple instances of the CSI-RS over the span of time instances, wherein the CSI report comprises an indication of an estimation of linear combination coefficients to combine a spatial domain (SD) basis, a frequency domain (FD) basis, and a Doppler domain (DD) basis from the measured multiple instances of the CSI-RS performed by the wireless device; and predict a precoder utilizing the estimated linear combination coefficients, the SD basis, the FD basis, and the DD basis.

18. The network node of claim 17, the processing circuitry further operable to predict a channel quality indicator (CQI) utilizing the predicted precoder.

19. The network node of claim 17, wherein the linear combination coefficients are represented by a three-dimensional matrix where elements of the three-dimensional matrix denote weights to utilize to combine the SD basis, the FD basis, and the DD basis.

20. The network node of claim 17, wherein the multiple instances of the CSI-RS are uniformly spaced in time.

* * * * *